US009908219B2

(12) United States Patent
Takahashi et al.

(10) Patent No.: US 9,908,219 B2
(45) Date of Patent: Mar. 6, 2018

(54) CLAMP APPARATUS

(71) Applicant: SMC KABUSHIKI KAISHA, Chiyoda-ku (JP)

(72) Inventors: Kazuyoshi Takahashi, Koto-ku (JP); Hideki Sasaki, Toride (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 0 days.

(21) Appl. No.: 14/413,254

(22) PCT Filed: Aug. 6, 2013

(86) PCT No.: PCT/JP2013/071750
§ 371 (c)(1),
(2) Date: Jan. 7, 2015

(87) PCT Pub. No.: WO2014/025055
PCT Pub. Date: Feb. 13, 2014

(65) Prior Publication Data

US 2015/0137440 A1 May 21, 2015

(30) Foreign Application Priority Data

Aug. 7, 2012 (JP) ................................ 2012-174562

(51) Int. Cl.
*B23Q 3/08* (2006.01)
*B25B 5/08* (2006.01)
*B25B 1/04* (2006.01)

(52) U.S. Cl.
CPC ................ *B25B 5/087* (2013.01); *B25B 1/04* (2013.01)

(58) Field of Classification Search
CPC ......... B25B 1/04; B25B 5/087; B25J 15/0226
(Continued)

(56) References Cited

U.S. PATENT DOCUMENTS 4,537,389 A 8/1985 Kancnik et al.
2002/0084564 A1 7/2002 Horn et al.
(Continued)

FOREIGN PATENT DOCUMENTS

JP 2009-039389 2/2009
JP 2009-279698 12/2009
(Continued)

OTHER PUBLICATIONS

International Search Report and Written Opinion of the International Searching Authority dated Dec. 4, 2013, in PCT/JP2013/071750, filed Aug. 6, 2013.
(Continued)

*Primary Examiner* — Monica Carter
*Assistant Examiner* — Nirvana Deonauth
(74) *Attorney, Agent, or Firm* — Oblon, McClelland, Maier & Neustadt, L.L.P.

(57) ABSTRACT

A clamp apparatus includes a pair of first and second clamp arms. A driving force transmission mechanism transmits a driving force of a drive unit, whereby the first clamp arm is operated to rotate via a link arm, while simultaneously, the second clamp arm is rotated, and after being rotated through a predetermined angle, under moving action of a roller, which is inserted into a cam groove of a link plate, rotation of the second clamp arm is stopped and maintained in advance with respect to the first clamp arm. Consequently, after positioning of a workpiece has been carried out by the second clamp arm, rotation of which is stopped, the first clamp arm continues to be rotated, whereby the workpiece is clamped.

7 Claims, 14 Drawing Sheets

(58) Field of Classification Search
USPC .................................................. 294/203, 116
See application file for complete search history.

(56) References Cited

U.S. PATENT DOCUMENTS

| | | | | |
|---|---|---|---|---|
| 2002/0093211 | A1* | 7/2002 | Filipiak | B25B 5/087 294/203 |
| 2007/0241577 | A1* | 10/2007 | Waldorf | B25J 15/0226 294/203 |
| 2008/0018124 | A1 | 1/2008 | Waldorf et al. | |
| 2011/0018292 | A1 | 1/2011 | Waldorf et al. | |
| 2012/0049553 | A1 | 3/2012 | Waldorf et al. | |

FOREIGN PATENT DOCUMENTS

| | | | |
|---|---|---|---|
| JP | 4950123 | | 6/2012 |
| WO | 95/21722 | A1 | 8/1995 |
| WO | 2008/011209 | A1 | 1/2008 |

OTHER PUBLICATIONS

Japanese Office Action issued in Application No. 2014-559004 dated Nov. 8, 2016 (w/ partial English translation).

* cited by examiner

CLAMP APPARATUS

TECHNICAL FIELD

The present invention relates to a clamp apparatus for clamping workpieces on an automated assembly line or the like.

BACKGROUND ART

Heretofore, in an automated assembly line for automobiles, an assembly process has been carried out in which clamping is carried out by a clamp apparatus under a condition in which pre-formed frames are positioned in an overlaid manner and the frames are welded together.

As one such clamp apparatus, as disclosed in Japanese Patent No. 4950123, a pair of left and right clamp arms are provided, the clamp arms being disposed for rotation respectively through pins, and ends of the clamp arms are supported pivotally via a base to which a drive unit is connected, whereby distal ends of the clamp arms are operated to open and close. Thus, a workpiece such as a frame or the like is gripped from the left and the right by the distal ends of the pair of clamp arms.

SUMMARY OF INVENTION

With the aforementioned clamp apparatus, since the pair of clamp arms are operated simultaneously and in the same manner, for example, in a condition in which a workpiece is set in a predetermined position, it is possible for the workpiece to be clamped uniformly by the clamp arms from the left and the right. However, in a condition in which the workpiece has become shifted to the left or the right with respect to the predetermined position, or if there are variations in workpiece dimensions, a difference may occur between the timing (and abutment position) at which one of the clamp arms abuts against the workpiece, and the timing (and abutment position) at which the other of the clamp arms abuts against the workpiece, thus making it impossible for the workpiece to be clamped with high precision.

A general object of the present invention is to provide a clamp apparatus in which it is possible, after a workpiece has been positioned by clamp arms in a predetermined position, for the workpiece to be clamped reliably and highly precisely by the clamp arms.

The present invention is characterized by a clamp apparatus for clamping a workpiece with a pair of clamp arms by rotation of the clamp arms, comprising a body, a drive unit disposed on the body and having a displaceable body, which is displaced in axial directions, first and second clamp arms, which are supported rotatably with respect to the body and are arranged in a mutually confronting manner, a driving force transmission mechanism connected to the drive unit, and which converts linear displacement along an axial direction of the drive unit into rotary displacement and transmits a driving force of the drive unit to the first and second clamp arms, and positioning means connected to the driving force transmission mechanism for positioning and retaining the workpiece in a predetermined position at a stage prior to clamping the workpiece, by restricting rotation of the second clamp arm in advance of the first clamp arm when clamping of the workpiece is carried out.

According to the present invention, in a clamp apparatus having a pair of first and second clamp arms, and which is capable of clamping a workpiece between the first and second clamp arms, a positioning means is connected to the driving force transmission mechanism which is capable of transmitting a driving force of the drive unit to the first and second clamp arms. The positioning means positions and retains the workpiece in a predetermined position at a stage prior to clamping the workpiece, by restricting rotation of the second clamp arm in advance of the first clamp arm when clamping of the workpiece is carried out. In addition, when the first and second clamp arms are rotated to clamp the workpiece under a driving action of the drive unit, after the second clamp arm has been rotated by a predetermined angle, rotation of the second clamp arm is restricted by the positioning means, whereby the workpiece is positioned and retained in the predetermined position by abutment of the workpiece against the second clamp arm.

Accordingly, a workpiece which has been positioned by the second clamp arm can be clamped between the second clamp arm and the first clamp arm by sequential rotation of the first clamp arm under a driving action of the drive unit. Owing thereto, even in the event that the workpiece is set in a position that is shifted somewhat from the predetermined position intended for the workpiece, by prior movement of the second clamp arm so as to abut and press against the workpiece, the workpiece can be moved into the predetermined position and proper positioning thereof can be performed in advance, whereby the workpiece can then be clamped reliably and highly precisely by rotation of the first clamp arm.

The above and other objects features and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
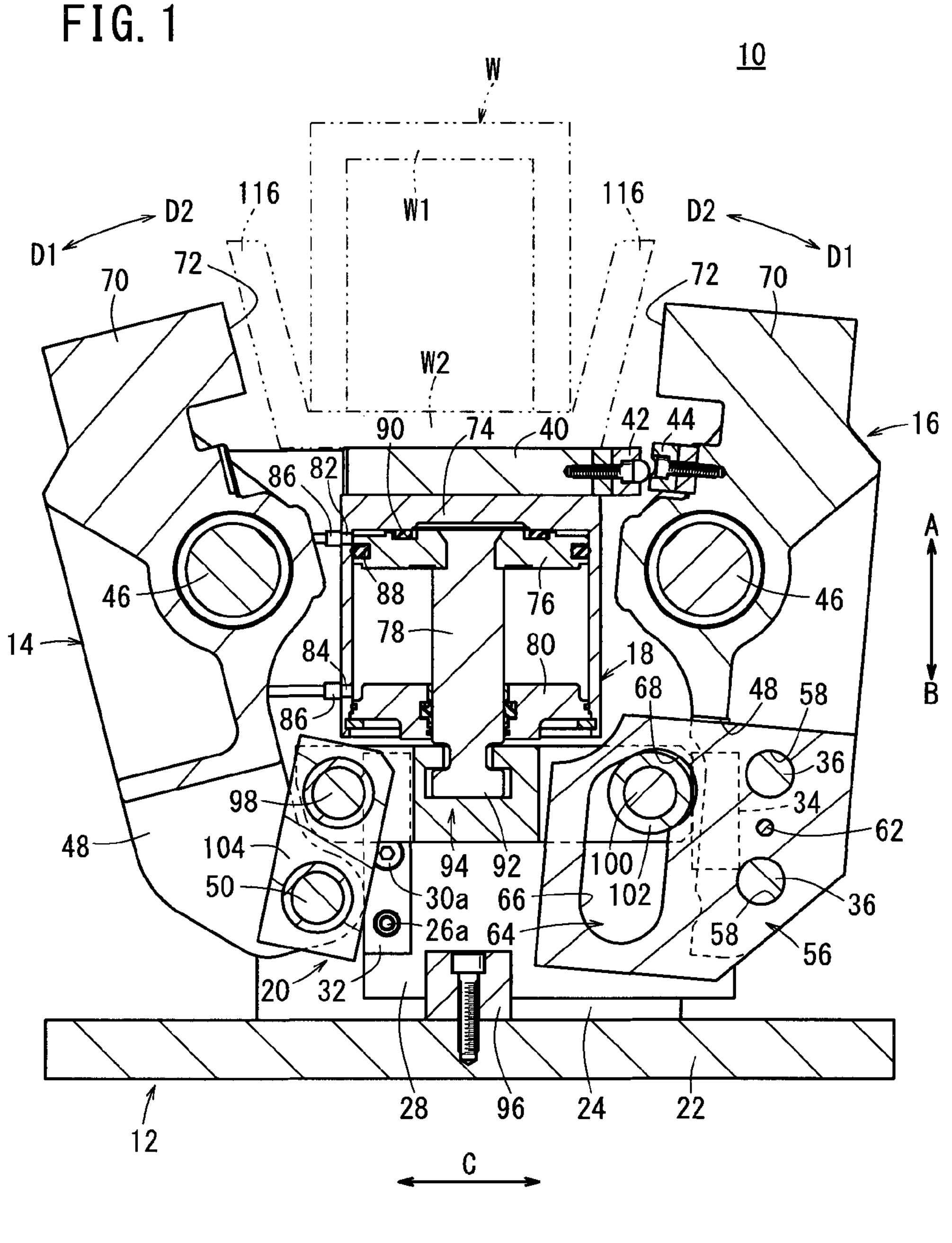
FIG. 1 is an overall cross sectional view of a clamp apparatus according to a first embodiment of the present invention.
Figure 2:
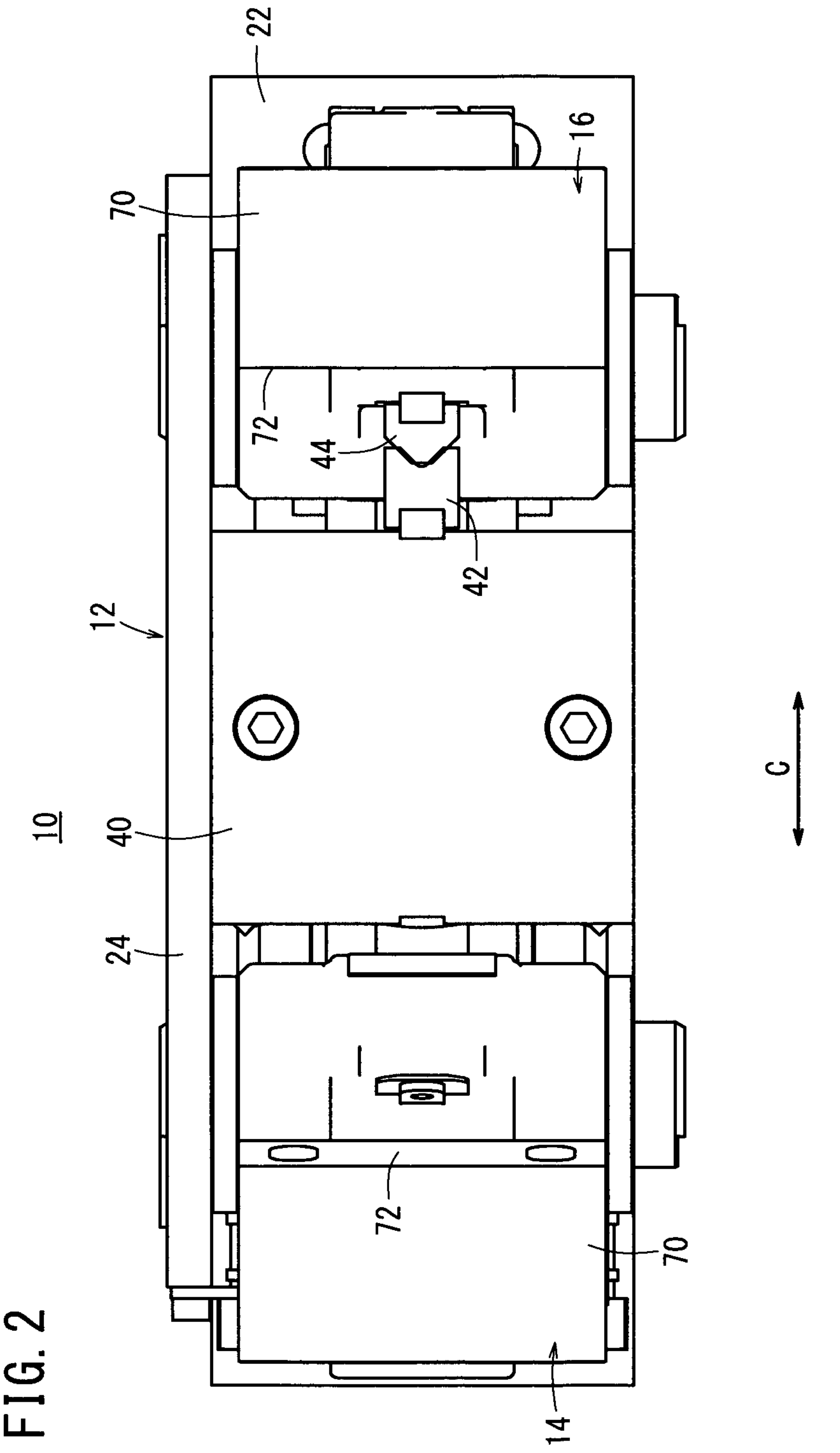
FIG. 2 is a top plan view of the clamp apparatus shown in FIG. 1.
Figure 3:
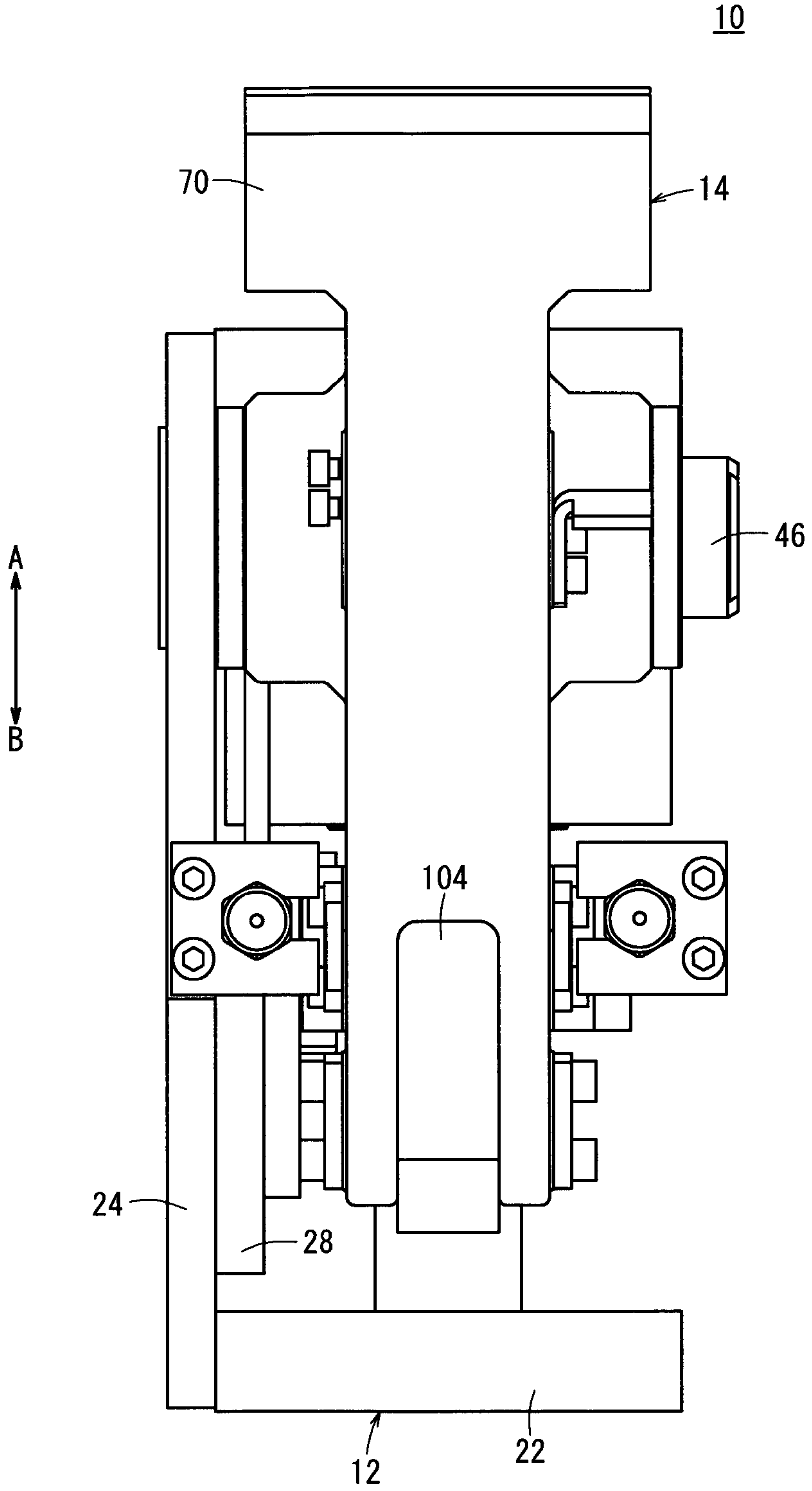
FIG. 3 is a side view of the clamp apparatus of FIG. 1 as seen from the side of a first clamp arm.

As shown in FIGS. 1 through 10, the clamp apparatus 10 includes a body 12, a pair of first and second clamp arms 14, 16 pivotally supported for rotation with respect to the body 12, a drive unit 18 fixed to the body 12, and a driving force transmission mechanism 20 for transmitting a driving force of the drive unit 18 to the first and second clamp arms 14, 16.

The body 12 is made up from a base 22, which is formed in a planar shape and is arranged in a horizontal direction, and a plate body 24 connected to a side surface of the base 22 in an upstanding manner with respect to the base 22. The base 22, for example, is mounted on a floor surface, such that the clamp apparatus 10 can be fixed in a given location by fixing the base 22 to the floor surface through non-illustrated bolts.

Figure 5:
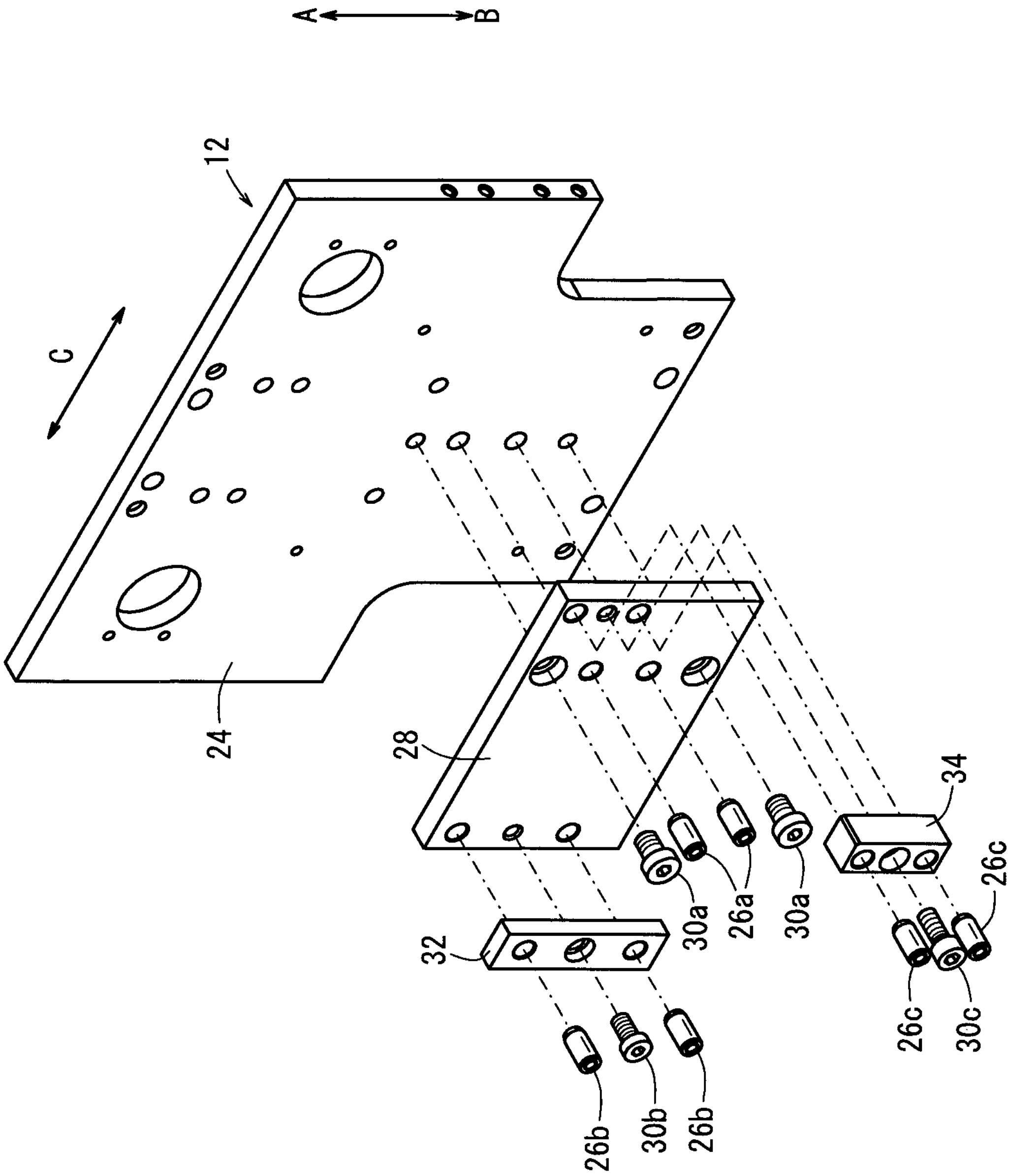
FIG. 5 is an exploded perspective view of a body of the clamp apparatus of FIG. 1.
Figure 6:
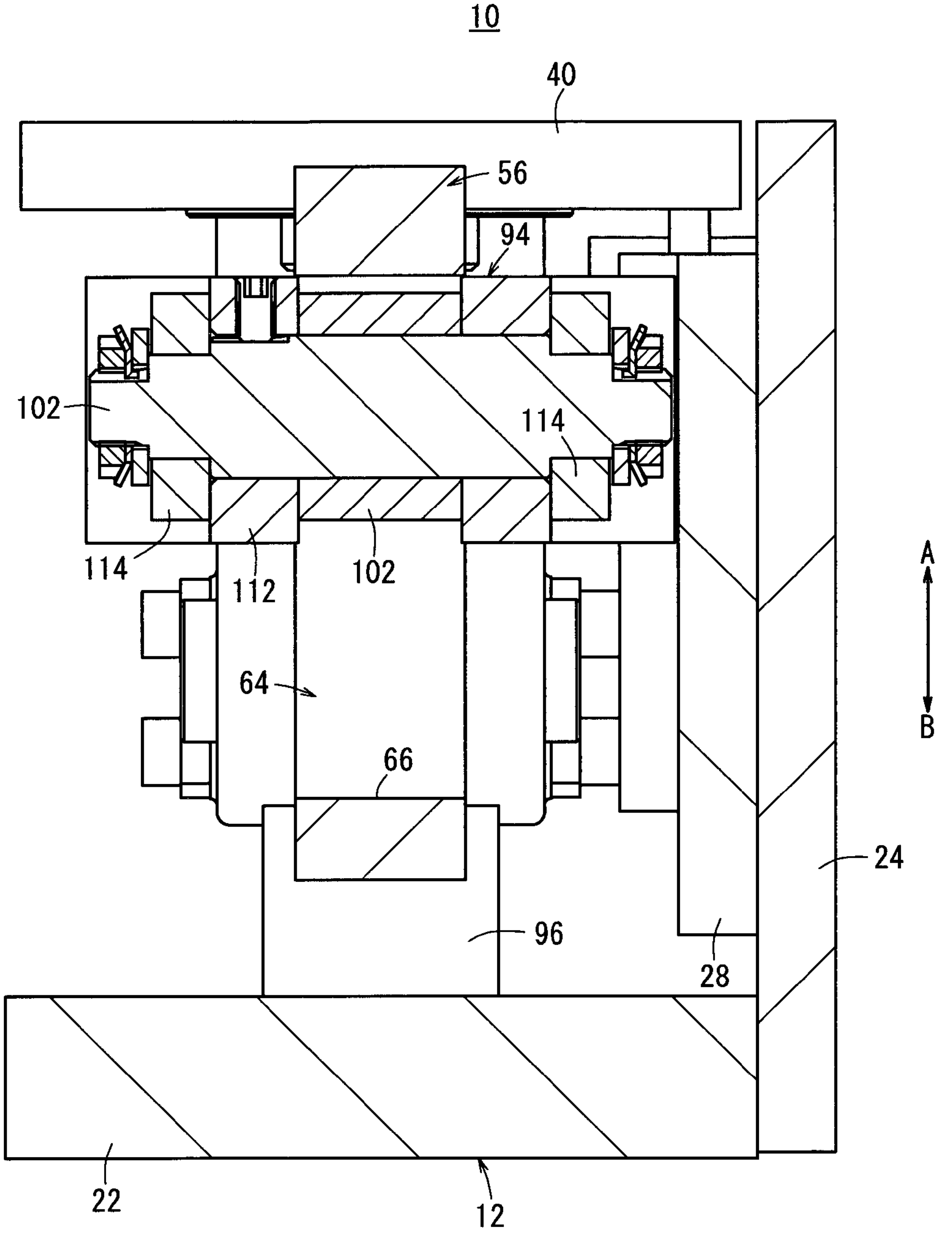
FIG. 6 is a cross sectional view taken along line VI-VI of FIG. 4.

The plate body 24 is formed with a predetermined height in an upward direction (the direction of the arrow A) with respect to the base 22. As shown in FIG. 5, a sub-plate 28 is fixed by connecting bolts 30*a* and via a pair of positioning pins 26*a* with respect to the surface of the plate body 24. The sub-plate 28 is formed in a planar and substantially rectangular shape, and is fixed to a lower portion of the plate body 24 confronting the base 22.

Further, at one end in a widthwise direction (the direction of the arrow C) of the sub-plate 28, a first guide body 32 is disposed, which guides a later-described block 94 in vertical directions (the directions of arrows A and B), whereas at the other end in the widthwise direction (the direction of the arrow C) thereof, a second guide body 34 is disposed, which serves to guide a roller 102 rotatably supported by a later-described second clamp arm 16. More specifically, a guide section is constituted from the first guide body 32 that guides the block 94, and the second guide body 34 that guides the roller 102.

The first and second guide bodies 32, 34 are formed with rectangular shapes having predetermined widths, and are arranged such that longitudinal dimensions thereof are arranged perpendicularly with respect to the widthwise direction (the direction of the arrow C) of the sub-plate 28. In addition, the first guide body 32 is formed to be longer in a longitudinal direction than the second guide body 34. In a state of being positioned on the sub-plate 28 by two positioning pins 26*b*, the first guide body 32 is fixed to the sub-plate 28 by a connecting bolt 30*b* disposed between the positioning pins 26*b*.

The second guide body 34, similar to the first guide body 32, is fixed to the sub-plate 28 by a connecting bolt 30*c*, which is disposed between two positioning pins 26*c*, in a state of being positioned on the sub-plate 28 by the positioning pins 26*c*.

Moreover, the first and second guide bodies 32, 34 are disposed respectively on different side surfaces that face the driving force transmission mechanism 20 in the body 12.

At an upper portion of the body 12, a ceiling portion 40 is connected to an upper end part of the plate body 24. The ceiling portion 40 is arranged perpendicularly with respect to a direction of extension (the direction of arrows A and B) of the plate body 24, and is disposed on the body 12 substantially centrally in the widthwise direction thereof. Stated otherwise, the ceiling portion 40 is disposed substantially parallel with the base 22.

A recessed catch groove 42, which is substantially V-shaped in cross section, is formed on a side surface of the ceiling portion 40 that faces toward the later-described second clamp arm 16 (see FIG. 2), and a positioning member 44 formed on the second clamp arm 16 is engaged with the catch groove 42. In addition, when the workpiece W is clamped by the clamp apparatus 10, the workpiece W is mounted on an upper surface of the ceiling portion 40 (see FIG. 1).

The first and second clamp arms 14, 16 are formed in substantially mutually symmetrical shapes, and are disposed on the body 12 in facing relation to a surface of the plate body 24. The first and second clamp arms 14, 16 are supported rotatably on the body 12 via first arm pins 46, which are inserted through substantially central portions thereof in longitudinal directions of the first and second clamp arms 14, 16.

Further, on ends of the first and second clamp arms 14, 16, which are arranged on the side of the base 22 (in the direction of the arrow B), bifurcated fork-shaped yokes 48 are included, respectively. On an angled portion of the yoke 48 on the first clamp arm 14, a later-described link arm 104 is pivotally supported for rotation via a second arm pin 50.

Figure 7:
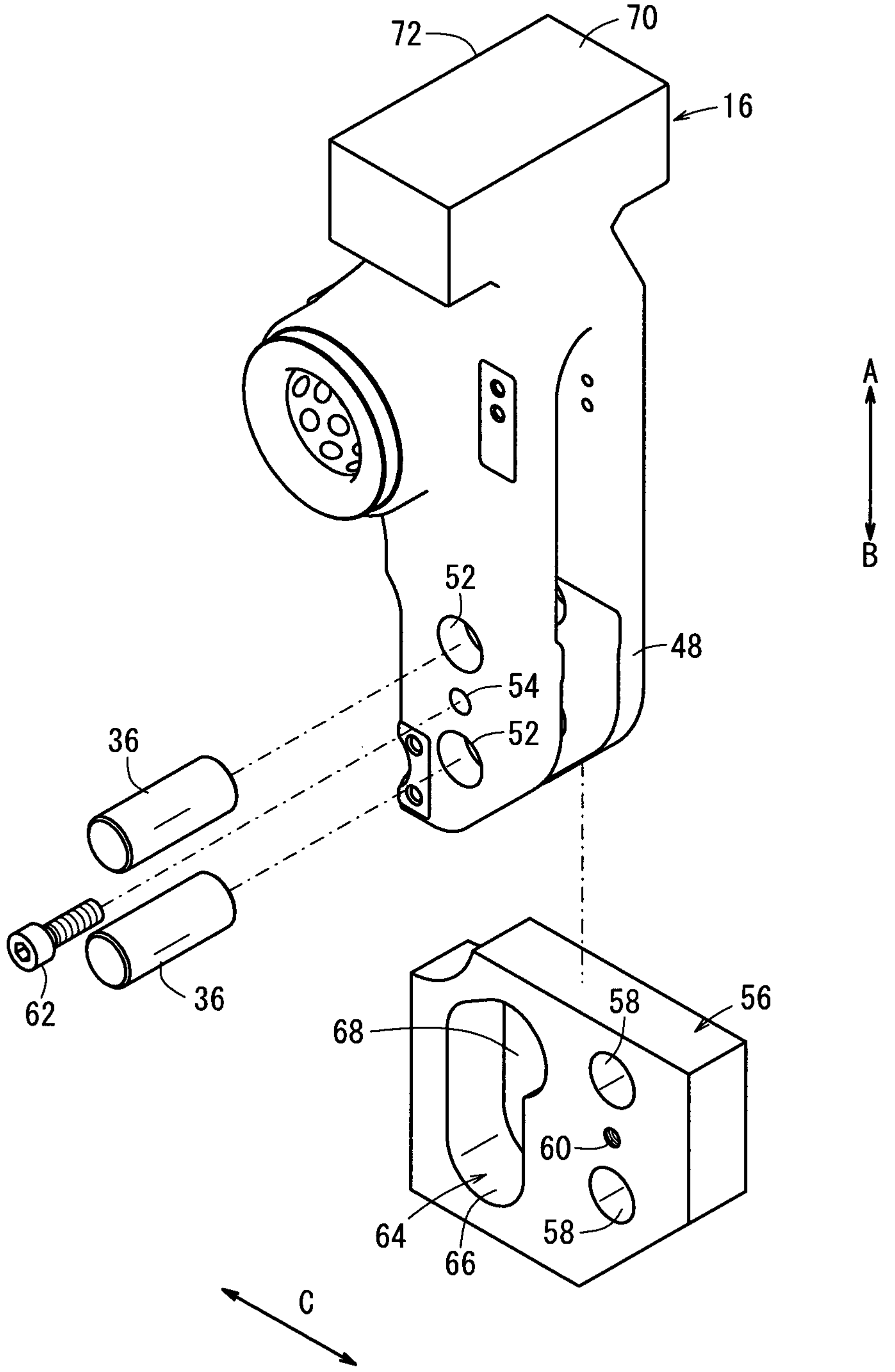
FIG. 7 is an exploded perspective view of a second clamp arm and a link plate in the clamp apparatus of FIG. 1.
Figure 8:
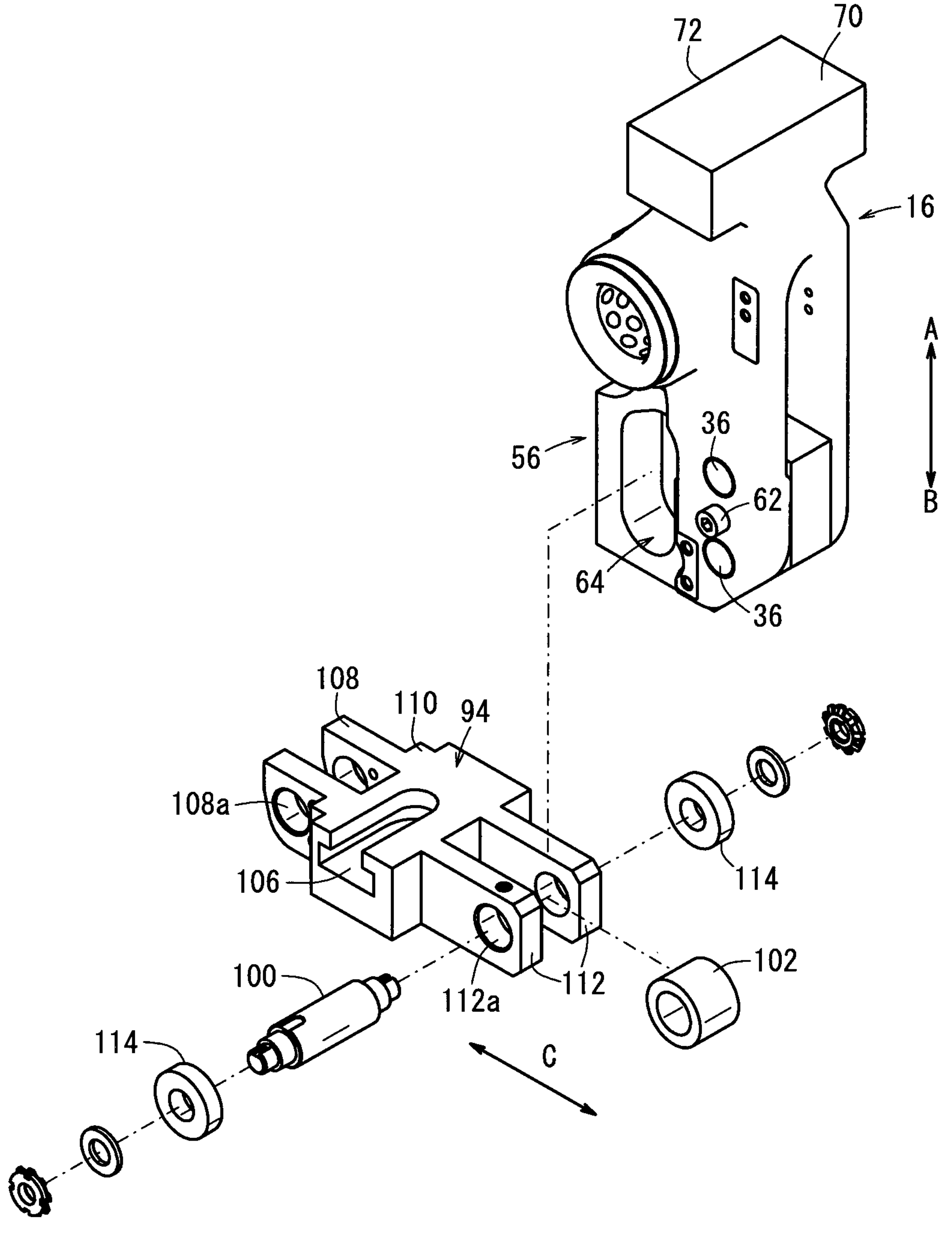
FIG. 8 is an exploded perspective view of the second clamp arm and a block body in the clamp apparatus of FIG. 7.

On the other hand, as shown in FIGS. 7 and 8, on the yoke 48 of the second clamp arm 16, a pair of first locating holes 52 is formed, together with a through hole 54, which is arranged between the first locating holes 52. The first locating holes 52 and the through hole 54 are arranged on a line and are separated by predetermined distances. The first locating holes 52 and the through hole 54 penetrate through the yoke 48 in a thickness-wise direction thereof.

One end of a plate-shaped link plate 56 is inserted into the yoke 48 of the second clamp arm 16, and by insertion of locating pins 36 through a pair of second locating holes 58 formed in the one end, as well as through the first locating holes 52 of the second clamp arm 16, the link plate 56 is positioned with respect to the one end of the second clamp arm 16. In addition, the link plate 56 is fixed with respect to the second clamp arm 16 by a fixing bolt 62, which is inserted through the through hole 54 in the second clamp arm 16, and is screw-engaged with a screw hole 60 of the link plate 56 (see FIG. 8).

Consequently, the other end side of the link plate 56 is fixed with respect to the end of the second clamp arm 16, so as to project toward the side of the first clamp arm 14.

On the other hand, on the other end side of the link plate 56, a cam groove 64 is formed through which the later-described roller 102 is inserted. The cam groove 64 includes a first groove part (restriction groove part) 66 that extends in the vertical direction (the direction of arrows A and B), and a second groove part (rotation groove part) 68, which is joined to an upper end of the first groove part 66, and is inclined at a predetermined angle with respect to the upper end toward the one end side of the link plate 56. The first and second groove parts 66, 68 are formed with a width dimension that is substantially the same or slightly greater than the diameter of the later-described roller 102.

Figure 9:
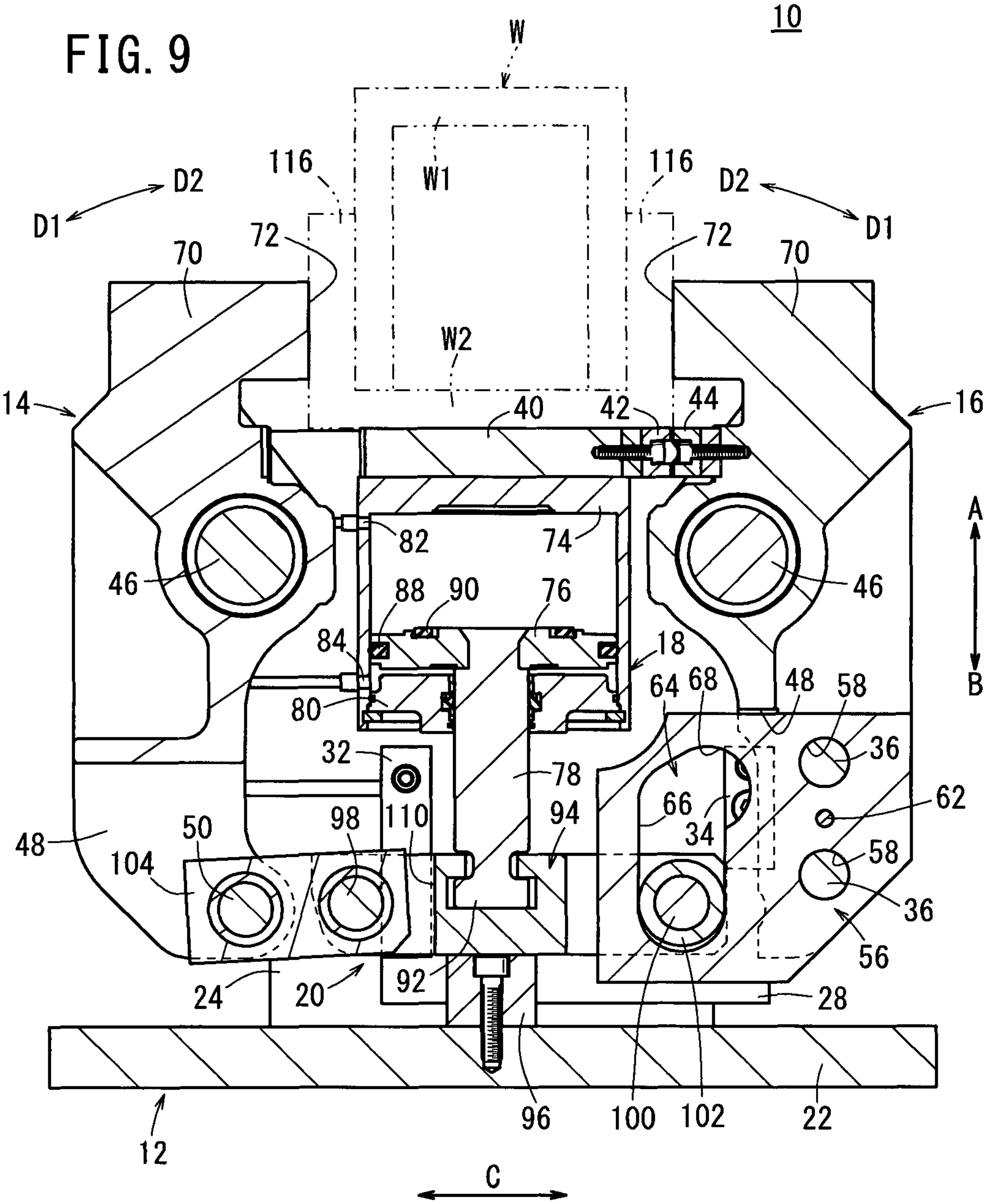
FIG. 9 is an overall cross sectional view showing a clamped state of the clamp apparatus of FIG. 1.

Further, as shown in FIG. 9, the first groove part 66 is arranged such that, when the second clamp arm 16 is in a clamped state, the inner wall surface on the one end side of the link plate 56 lies substantially in alignment with the side surface of the second guide body 34 that is disposed on the body 12.

On the other hand, on other ends of the first and second clamp arms 14, 16, gripping portions 70 are formed for clamping the workpiece W. Gripping surfaces 72 of the gripping portions 70, which are rectangular in cross section and confront one another mutually, are formed as vertical surfaces, which extend substantially in parallel with longitudinal directions of the first and second clamp arms 14, 16.

Further, the first arm pins 46 are shaft shaped, and, in positions between one end and the other end of the first and second clamp arms 14, 16, the first arm pins 46 are inserted perpendicularly with respect to the longitudinal directions of the first and second clamp arms 14, 16. In addition, ends of the first arm pins 46 are supported on the plate body 24. Consequently, the first and second clamp arms 14, 16 are supported rotatably on the body 12 via the first arm pins 46, which are inserted through substantially central portions of the first and second clamp arms 14, 16.

Furthermore, below the gripping portion 70 of the second clamp arm 16, a positioning member 44 is formed, which projects perpendicularly to the longitudinal direction of the second clamp arm 16. As viewed from above, the positioning member 44 has a triangular shape in cross section, tapering in a direction away from the second clamp arm 16 (see FIG. 2). In addition, in a clamped state in which the gripping portion 70 of the second clamp arm 16 approaches the workpiece W to grip the workpiece W, the positioning member 44 and the catch groove 42 of the ceiling portion 40 come into engagement with each other.

The drive unit 18 includes a bottomed tubular shaped cylinder tube 74 disposed in a substantially central position of the body 12, a piston (displaceable body) 76 disposed for displacement in the interior of the cylinder tube 74, a piston rod (displaceable body) 78 connected to the piston 76, and a rod cover 80 disposed in an opening of the cylinder tube 74 and which supports the piston rod 78 while permitting displacement of the piston rod 78 through the rod cover 80.

First and second ports 82, 84, which penetrate through the cylinder tube 74 perpendicularly to the axial direction of the cylinder tube 74 (in the directions of the arrows A and B), are formed in a side surface of the cylinder tube 74. The interior of the cylinder tube 74 communicates with the exterior through the first and second ports 82, 84. The first port 82 is disposed on one end side (in the direction of the arrow A) on a bottom side of the cylinder tube 74, whereas the second port 84 is disposed on the other end side (in the direction of the arrow B) of the cylinder tube 74 on the side of the rod cover 80.

In addition, pipes, which are connected to a non-illustrated pressure fluid supply source, are connected respectively through pipe joints 86 to the first and second ports 82, 84. Under a switching action of a non-illustrated switching device, a pressure fluid is supplied selectively to either one of the first port 82 and the second port 84. The cylinder tube 74 is fixed by non-illustrated bolts to the plate body 24. More specifically, the drive unit 18 comprises a fluid pressure cylinder, which is capable of displacing the piston 76 and the piston rod 78 along the axial directions (the directions of arrows A and B) under the supply of a pressure fluid.

The piston 76 is formed in a disk shape, for example, and has a piston packing 88 installed in an annular groove formed in an outer circumferential surface thereof. The piston packing 88 is provided in sliding contact with the inner wall surface of the cylinder tube 74, so as to prevent leakage of pressure fluid between the piston 76 and the cylinder tube 74. Further, on an end surface of the piston 76 facing the one end side of the cylinder tube 74, an annular damper 90 is disposed so as to project from the end surface. Thus, as shown in FIG. 1, when the piston 76 is displaced toward the one end side (in the direction of the arrow A), the damper 90, which is formed from an elastic material such as rubber or the like, comes into abutment against the cylinder tube 74, whereby shocks can be buffered.

One end of the piston rod 78 is inserted through a central portion of the piston 76 and is connected by deforming integrally with the piston 76. The other end of the piston rod 78 projects to the exterior of the cylinder tube 74 through the rod cover 80. A connector 92, which is initially reduced in diameter and then expanded outward in diameter again, is formed on the other end of the piston rod 78. The block 94 that constitutes part of the driving force transmission mechanism 20 is connected to the connector 92.

The rod cover 80, after being inserted inside the cylinder tube 74, is latched by a latching ring, which is engaged with the inner circumferential surface of the cylinder tube 74. Together therewith, a rod packing, which is mounted on the inner circumferential surface of the rod cover 80, is placed in sliding contact with the outer circumferential surface of the piston rod 78, so that leakage of pressure fluid between the rod cover 80 and the piston rod 78 is prevented.

On the base 22, a block-shaped stopper 96 is disposed in a downward position (in the direction of the arrow B) of the piston rod 78, such that when the piston 76 and the piston rod 78 are lowered under a driving action of the drive unit 18, the block 94 (described later), which is connected to the piston rod 78, comes into abutment against the stopper 96 and further displacement thereof is restricted. An upper surface of the stopper 96 that confronts the drive unit 18 is formed with a flat rectangular shape in cross section, and the stopper 96 is fixed by a bolt with respect to the base 22.

Figure 4:
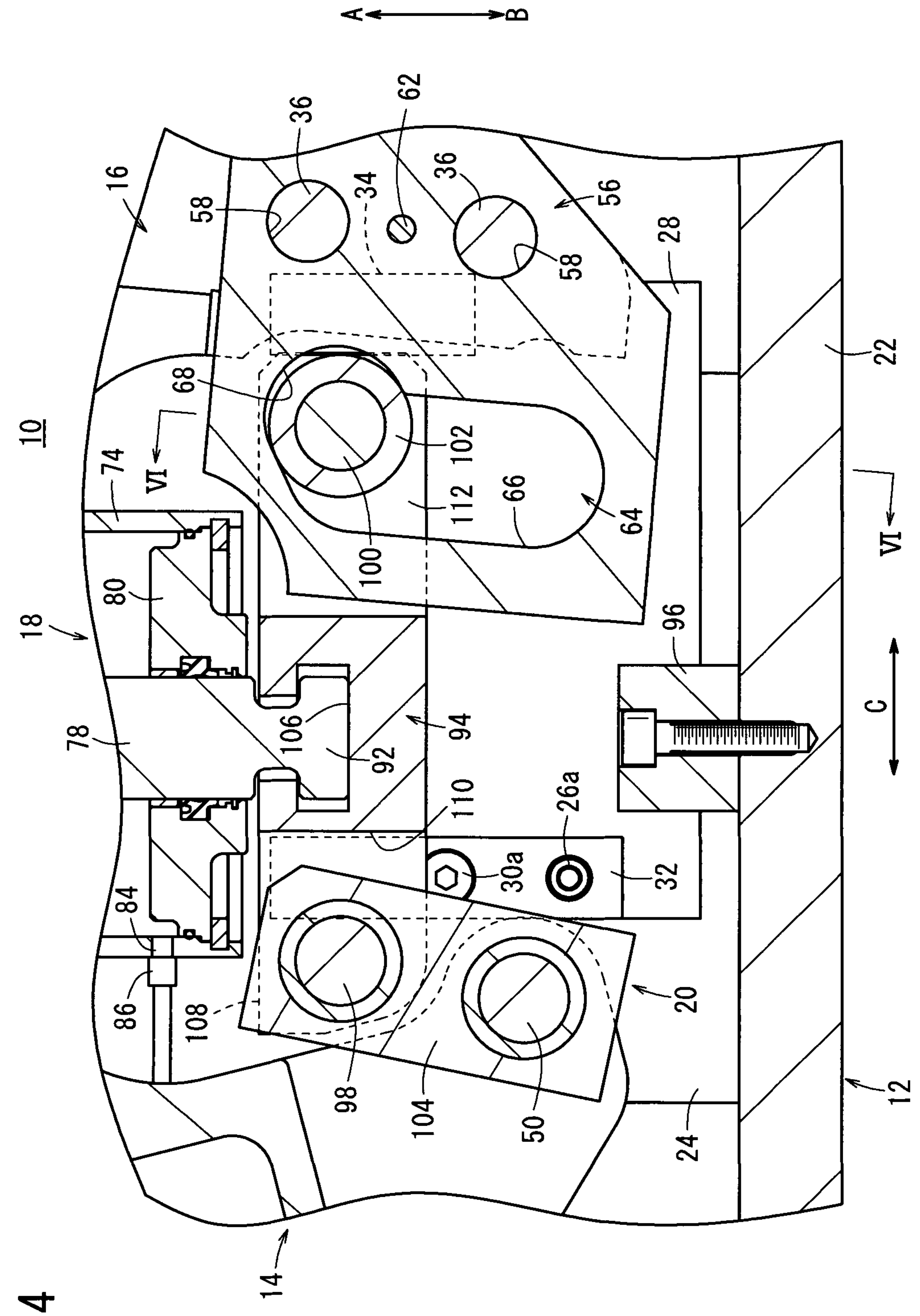
FIG. 4 is an enlarged cross sectional view showing the vicinity of a driving force transmitting mechanism in the clamp apparatus of FIG. 1.

As shown in FIGS. 1 and 4, the driving force transmission mechanism 20 includes the block 94, which is connected to the other end of the piston rod 78, a link pin 98 inserted through one end of the block 94, the roller 102, which is supported rotatably via a roller pin 100 on the other end of the block 94, and a link arm 104, which is supported for rotation between the link pin 98 and the second arm pin 50 of the first clamp arm 14.

The block 94 extends in a perpendicular direction (the direction of the arrow C) to the axial direction (the directions of arrows A and B) of the piston rod 78, and is formed with a groove 106 (see FIG. 4) in a center portion thereof, in which the connector 92 of the piston rod 78 is inserted. In addition, by insertion of the connector 92 in the groove 106 of the block 94, the block 94 is connected in a perpendicular condition with respect to the axial direction of the piston rod 78, and is displaceable integrally together with the piston rod 78.

Further, the block 94 has a predetermined length in a longitudinal direction (the direction of the arrow C), and both ends of the block 94 are distanced equally about the axis of the piston rod 78. On one end of the block 94 on the side of the first clamp arm 14, the other end of the link arm 104 is supported rotatably via a link pin 98, which is inserted through a pair of through holes 108*a* of a first retainer 108, which is formed in a bifurcated fork shape.

Furthermore, on the one end side of the block 94, a guide portion 110 is formed in a stepped fashion with respect to a distal end of the first retainer 108. The guide portion 110 is formed so as to come into abutment against a side surface of the first guide body 32, which is disposed on the body 12.

On the other hand, as shown in FIGS. 1, 4, and 8, on the other end side of the block 94 on the side of the second clamp arm 16, the roller 102 is arranged inside a second retainer 112, which is formed in a bifurcated fork shape. In addition, the roller 102 is supported rotatably by insertion of a roller pin 100 through two through holes 112*a* formed in the second retainer 112. The roller 102 is held on the second retainer 112 via a pair of spacers 114, and is inserted into the cam groove 64 of the link plate 56.

By raising and lowering the block 94 under a driving action of the drive unit 18, the first clamp arm 14 is rotated via the link arm 104, and the second clamp arm 16 is rotated together therewith via the link plate 56 in which the roller 102 is inserted. Further, the guide portion 110 of the block 94 abuts against the side surface of the first guide body 32, and by movement thereof along the first guide body 32, the block 94 is guided in vertical directions (the directions of arrows A and B).

The clamp apparatus 10 according to the first embodiment of the present invention is constructed basically as described above. Next, operations and advantageous effects of the clamp apparatus 10 will be described. In the following descriptions, the unclamped state shown in FIG. 1, in which the gripping portions 70 of the first and second clamp arms 14, 16 are mutually separated, will be referred to as an initial position.

In the initial position, a pressure fluid is supplied to the second port 84 to thereby move the piston 76 upward, whereby the gripping portion 70 of the first clamp arm 14 is rotated in a direction (i.e., the direction of the arrow D1) to move away from the gripping portion 70 of the second clamp arm 16 via the block 94 and the link arm 104 of the driving force transmission mechanism 20. On the other hand, by movement of the roller 102 into the second groove part 68 of the cam groove 64, the gripping portion 70 of the second clamp arm 16 is rotated in a direction (i.e., the direction of the arrow D1) to move away from the gripping portion 70 of the first clamp arm 14.

A brief description will now be presented concerning the workpiece W, which is gripped by the aforementioned clamp apparatus 10. The workpiece W is made up, for example, from a first frame W1, which is U-shaped in cross section and constitutes part of the frame of a vehicle, and a second frame W1, which is U-shaped in cross section and is intended for assembly onto the first frame W1.

In a state in which an opening of the first frame W1 is oriented downward (in the direction of the arrow B), the first frame W1 is placed between the gripping portions 70 of the first and second clamp arms 14, 16. On the other hand, side walls 116 of the second frame W2 are formed in an inclined manner, so as to expand gradually outward toward the open side thereof, and the opening is arranged to face upwardly (in the direction of the arrow A). Additionally, the workpiece W is mounted on the ceiling portion 40, in a state in which the first frame W1 is inserted into the interior of the second frame W2.

Stated otherwise, the second frame W2 is arranged on the outside of the first frame W1, and the side walls 116 of the second frame W2 are inclined in a gradually expanding manner toward sides of the first and second clamp arms 14, 16.

Figure 10:
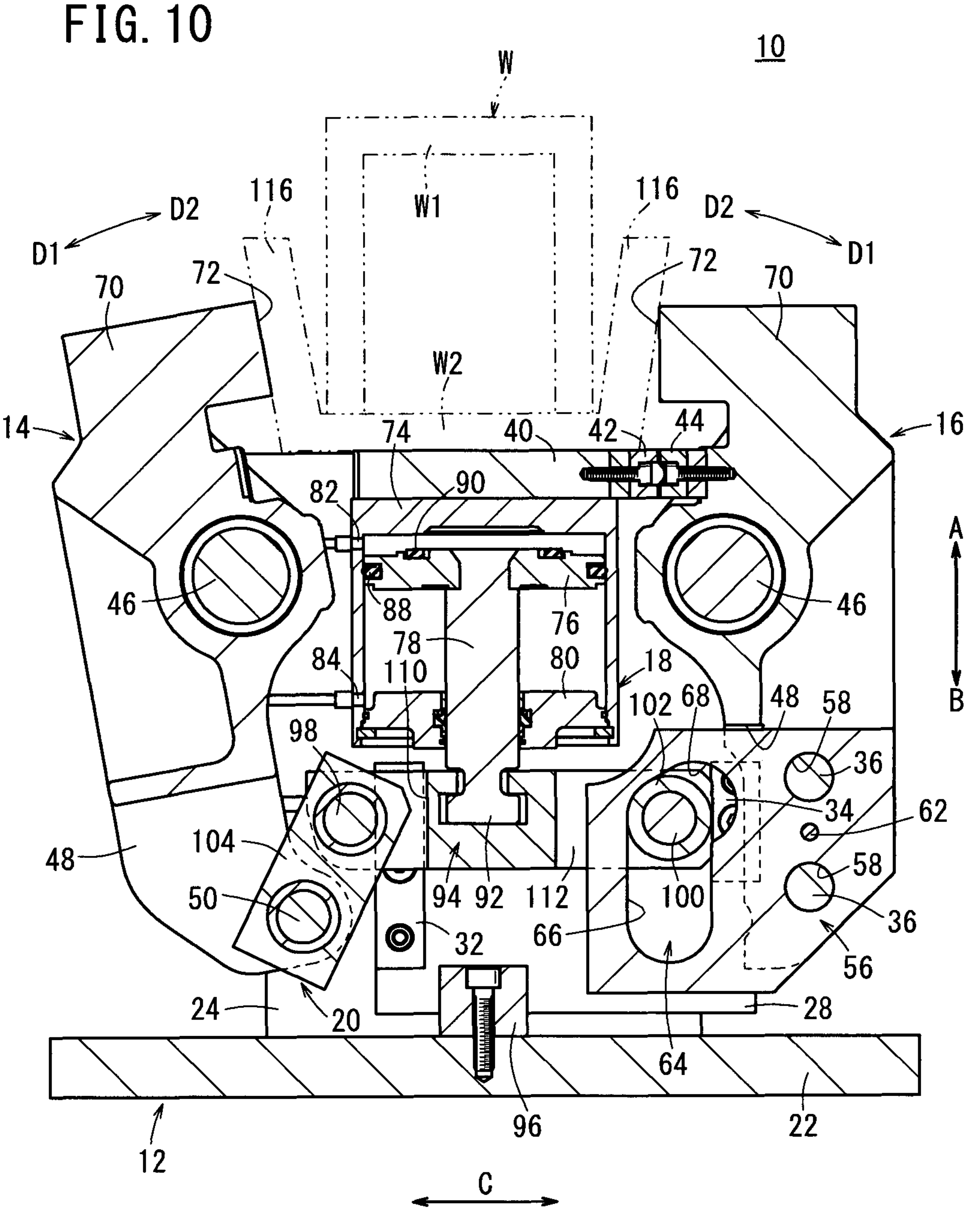
FIG. 10 is an overall cross sectional view showing a state in which rotation of the first and second clamp arms is initiated from an unclamped state of the clamp apparatus of FIG. 1.

In this manner, in a state in which the workpiece W is set at a predetermined position in the clamp apparatus 10, under a switching action of a non-illustrated switching device, the pressure fluid, which had been supplied to the second port 84, is switched and supplied instead to the first port 82. As a result, as shown in FIG. 10, the piston 76 is pressed toward the side of the rod cover 80 (in the direction of the arrow B) by the pressure fluid that is introduced into the cylinder tube 74, whereby the piston 76 is lowered integrally with the piston rod 78 and the block 94. At this time, the block 94 is made to move in a state in which the guide portion 110 abuts against a side surface of the first guide body 32, which is disposed on the body 12, and therefore, the block 94 is guided with high precision in a vertical downward direction (in the direction of the arrow B).

Consequently, the one end side of the link arm 104 pivotally supported by the link pin 98 moves downward, and the link arm 104 is tilted gradually into a substantially horizontal orientation, accompanied by the one end of the first clamp arm 14, which is connected to the other end of the link arm 104, being pressed in a direction to separate mutually therewith. In addition, while being pivotally supported about the first arm pin 46, the gripping portion 70 on the other end of the first clamp arm 14 begins to rotate in a direction (the direction of the arrow D2) to approach the side of the second clamp arm 16.

Further, simultaneously with start of rotation of the first clamp arm 14, along with lowering of the block 94, the roller 102 moves downward inside the cam groove 64, and then the roller 102 moves from the second groove part 68 into the first groove part 66. At this time, the roller 102 moves in a vertical downward direction (the direction of the arrow B) along the side surface of the second guide body 34.

Consequently, upon movement of the roller 102, the one end of the second clamp arm 16 is pressed in a direction away from the first clamp arm 14, accompanied by the one end of the second clamp arm 16 being made to rotate about the first arm pin 46 in a direction away from the first clamp arm 14. In addition, at a stage in which the roller 102 has moved into the first groove part 66, since rotation of the link plate 56 is restricted, rotational movement of the second clamp arm 16 is stopped. At this time, the second clamp arm 16 comes into abutment against the side wall 116 of the second frame W2, thereby resulting in clamping of the workpiece W, and a clamped state is brought about, in which the gripping surfaces 72 of the gripping portions 70 are substantially parallel and aligned with each other in the vertical direction (the direction of arrows A and B).

More specifically, the first and second clamp arms 14, 16 begin to rotate together with lowering of the block 94 under a driving action of the drive unit 18, and at a stage in which the roller 102 moves from the second groove part 68 into the first groove part 66, rotational movement only of the second clamp arm 16 in the direction of the arrow D2 is stopped.

At this time, the positioning member 44, which is disposed on the second clamp arm 16, comes into engagement with the catch groove 42 of the body 12, whereby at the time of clamping, the second clamp arm 16 is positioned in a predetermined stop position.

In addition, under a driving action of the drive unit 18, the block 94 is lowered further, whereby the one end side of the first clamp arm 14 is pressed further in a direction away from the second clamp arm 16 via the link arm 104. Along therewith, the gripping portion 70 of the first clamp arm 14 is rotated about the first arm pin 46 in a direction (the direction of the arrow D2) to approach the second clamp arm 16. Owing thereto, the one side wall 116 of the second frame W2 is pressed and deformed toward the side of the second clamp arm 16, i.e., toward the side of the first frame W1.

On the other hand, since the roller 102 moves downward along the first groove part 66 that extends in a vertical direction in the cam groove 64 of the link plate 56, a thrust force is not applied via the link plate 56 to the one end side of the second clamp arm 16 in directions to approach toward or separate away from the first clamp arm 14, and rotation of the second clamp arm 16 is stopped completely.

Furthermore, by lowering the block 94, as shown in FIG. 10, the first clamp arm 14 rotates further, and the gripping portion 70 thereof is moved in a direction (the direction of the arrow D2) to approach the side of the second clamp arm 16, whereby the side walls 116 of the second frame W2 are mutually pressed and deformed so as to approach each other, the side walls 116 of the second frame W2 are brought into abutment against the side walls of the first frame W1, and a clamped state is brought about in which the clamping is completed in a state where the side walls of the workpiece are substantially parallel (see FIG. 9).

In addition, in a state in which the first and second frames W1, W2 are clamped by the first and second clamp arms 14, 16, the side walls of the first and second frames W1, W2 are welded together, for example, using a non-illustrated welding device.

In the foregoing manner, by lowering the block 94 of the driving force transmission mechanism 20 under a driving action of the drive unit 18, the first clamp arm 14 is rotated via the link arm 104 so that the gripping portion 70 thereof approaches the side of the second clamp arm 16, while rotary operation of the second clamp arm 16 is maintained in a state of being rotated through a predetermined angle by the roller 102, which is inserted into the cam groove 64 of the link plate 56. Owing thereto, after positioning of the workpiece W has been performed by the second clamp arm 16 rotary operation of which is maintained in advance with respect to the first clamp arm 14, the first clamp arm 14 is then rotated in succession, whereby the workpiece W can be clamped at a predetermined position.

As has been described above, according to the first embodiment, in a clamp apparatus 10 having a pair of first and second clamp arms 14, 16, and which is capable of gripping a workpiece W between the first and second clamp arms 14, 16, an end of the first clamp arm 14 is connected to the block 94, which is linked with the drive unit 18 through the link arm 104, together with the link plate 56, which is formed with the cam groove 64 therein, being disposed on one end of the second clamp arm 16, and the roller 102 which is supported on the block 94 being inserted into the cam groove 64. Consequently, when clamping of the workpiece W is carried out by rotation of the first and second clamp arms 14, 16 under a driving action of the drive unit 18, after the second clamp arm 16 has been rotated by a predetermined angle, further rotation of the second clamp arm 16 is restricted by the roller 102 that is inserted in the cam groove 64, whereby positioning of the workpiece W can be maintained in a state of abutment of the workpiece W against the gripping portion 70 of the second clamp arm 16.

Accordingly, the workpiece W, which has been positioned by the second clamp arm 16, can be clamped by the first clamp arm 14, which is rotated in succession under the driving action of the drive unit 18.

Owing thereto, even in the event that the workpiece W is set in a position that is shifted somewhat from the predetermined position intended for the workpiece W (i.e., a position in which the center of the workpiece W in the widthwise direction is arranged centrally in relation to the widthwise dimension of the ceiling portion 40), by stopping rotation of the second clamp arm 16 in a state of abutment against the workpiece W, since the workpiece W can be moved to and held at the predetermined position, the workpiece W can then be clamped reliably and highly precisely upon subsequent rotation of the first clamp arm 14.

Next, a clamp apparatus 150 according to a second embodiment is shown in FIGS. 11 through 14. Constituent elements of the clamp apparatus 150, which are the same as those of the clamp apparatus 10 according to the above-described first embodiment, are designated by the same reference characters, and detailed description of such features is omitted.

Figure 11:
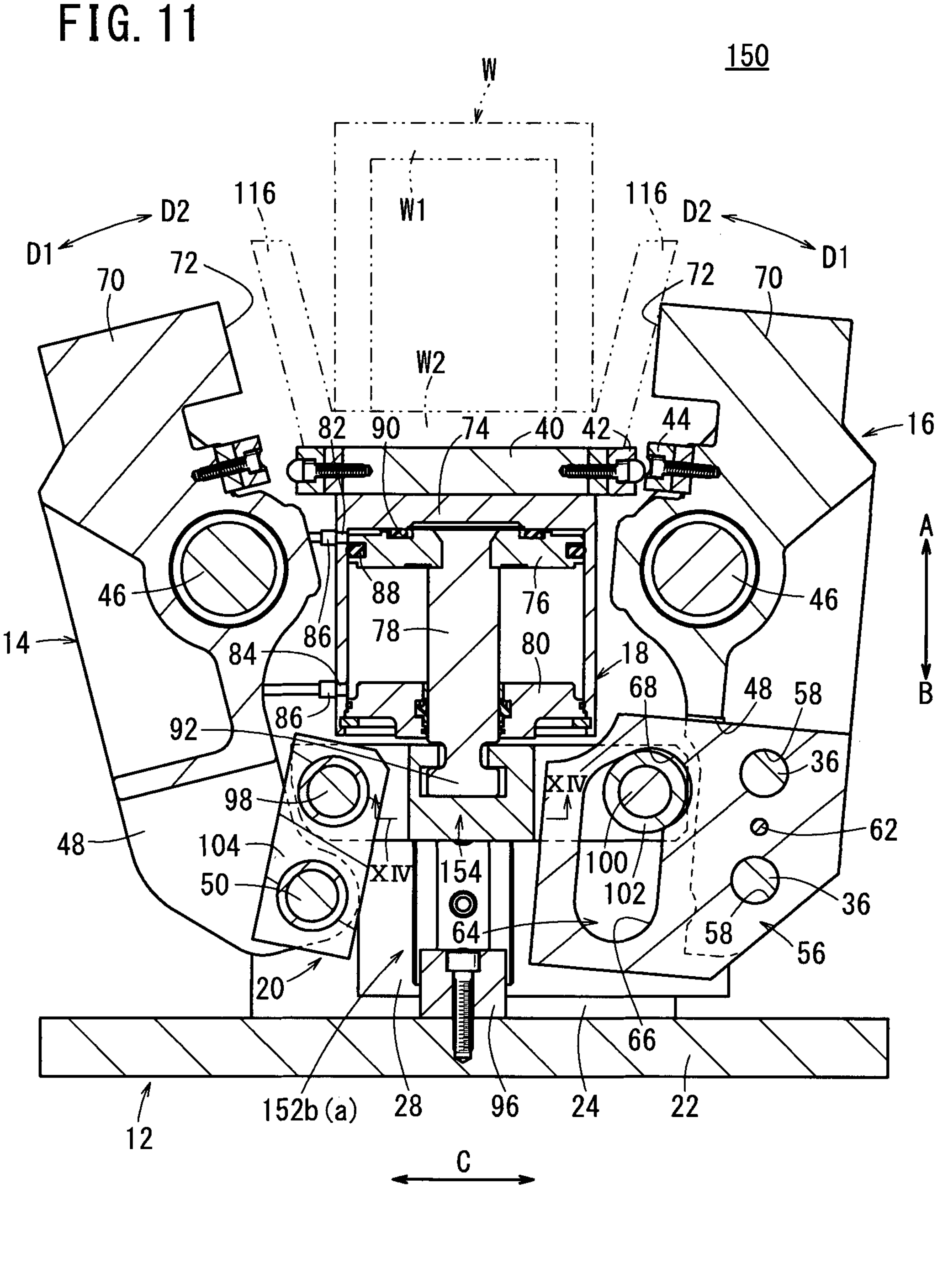
FIG. 11 is an overall cross sectional view of a clamp apparatus according to a second embodiment of the present invention.
Figure 12:
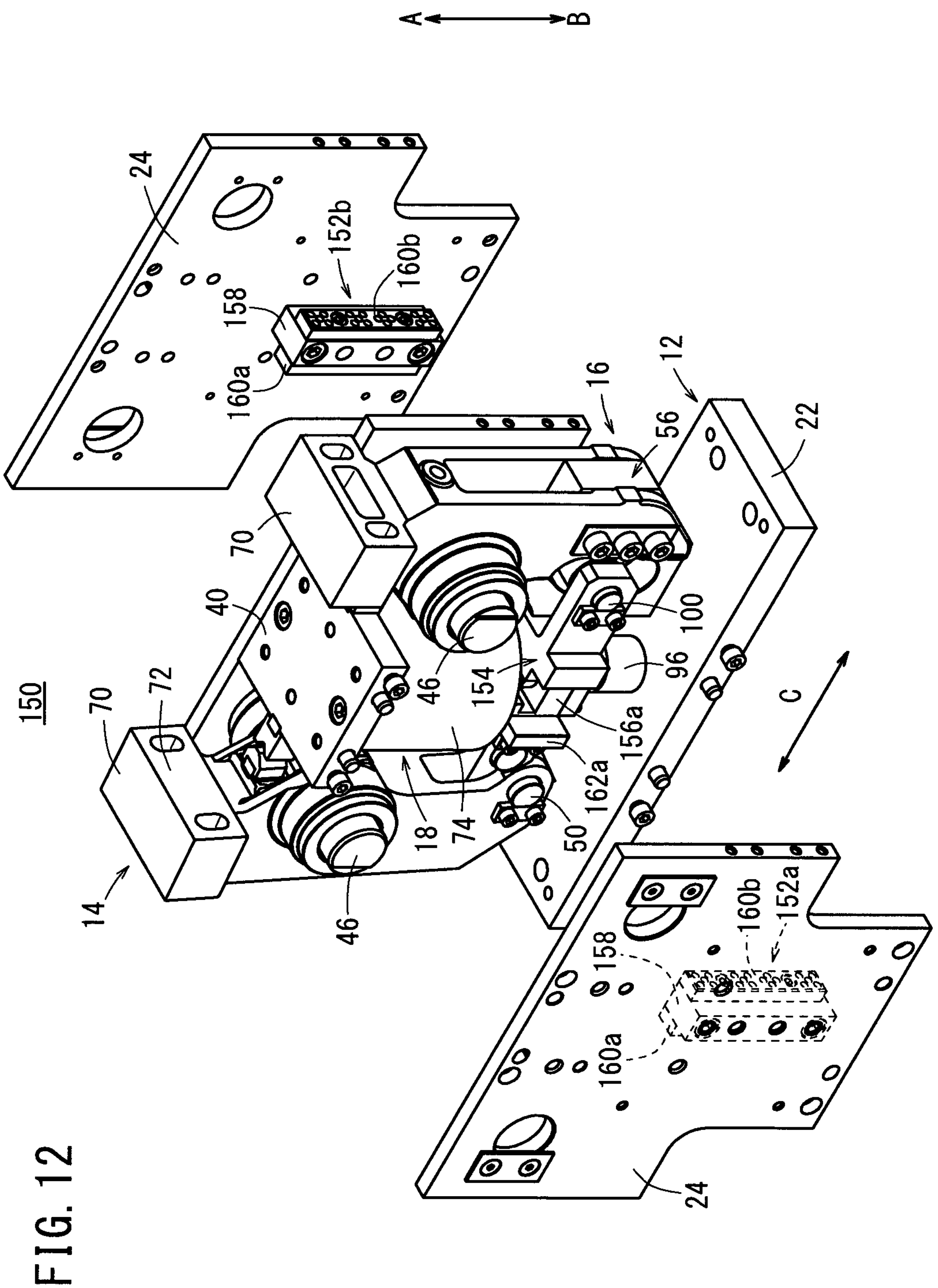
FIG. 12 is an exploded perspective view of the clamp apparatus of FIG. 11.
Figure 13:
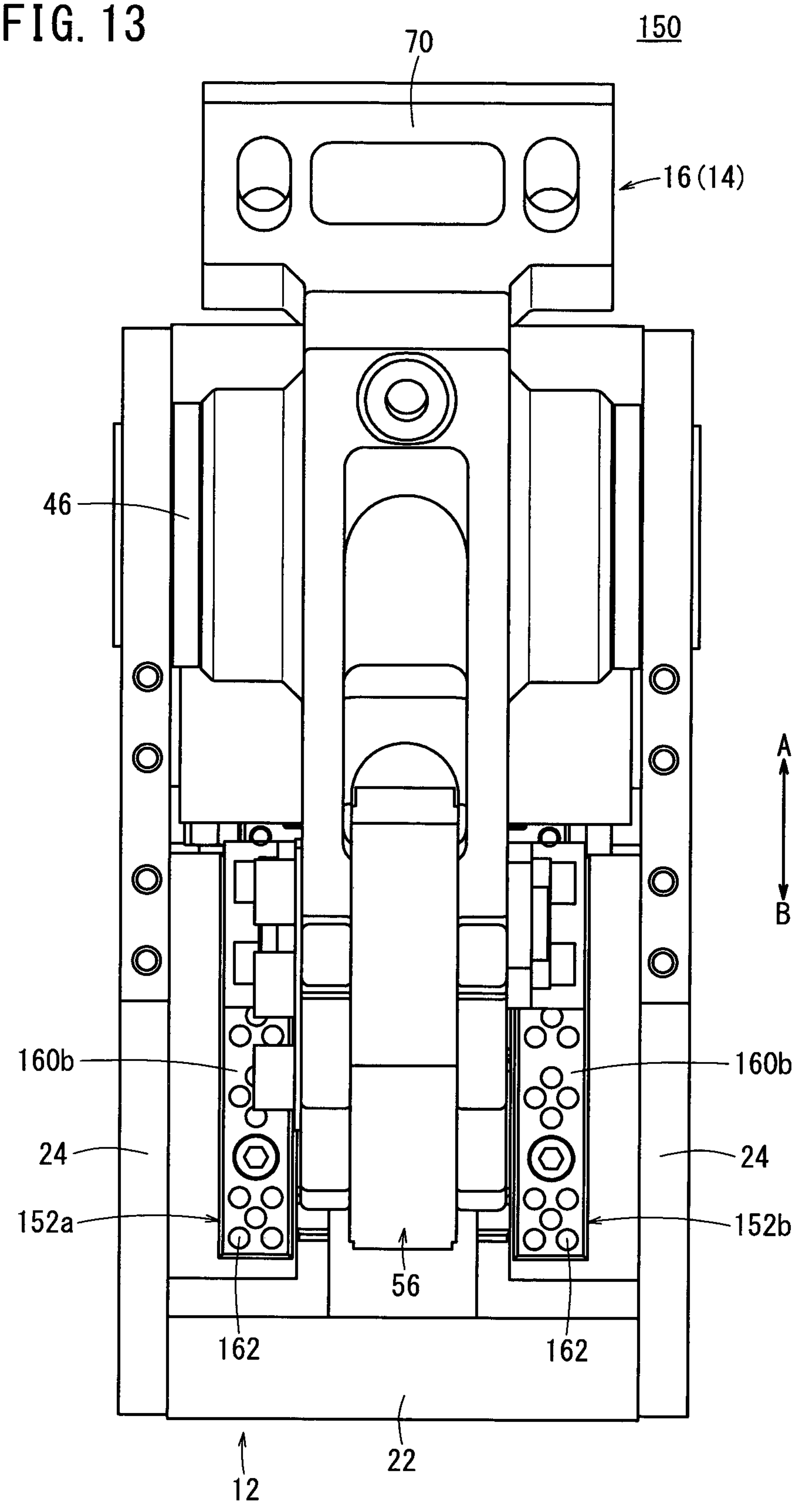
FIG. 13 is a side view of the clamp apparatus shown in FIG. 11.

The clamp apparatus 150 according to the second embodiment differs from the clamp apparatus 10 according to the first embodiment, in that, in place of the first guide body 32 that guides the block 94 in vertical directions (the directions of arrows A and B) and the second guide body 34 that guides the roller 102, as shown in FIGS. 11 through 13, guide bodies 152*a*, 152*b* are provided respectively on a pair of plate bodies 24, whereby a block 154 can be guided in the vertical directions by the guide bodies 152*a*, 152*b*, which are inserted respectively through guide grooves 156*a*, 156*b* formed on side surfaces of the block 154.

Figure 14:
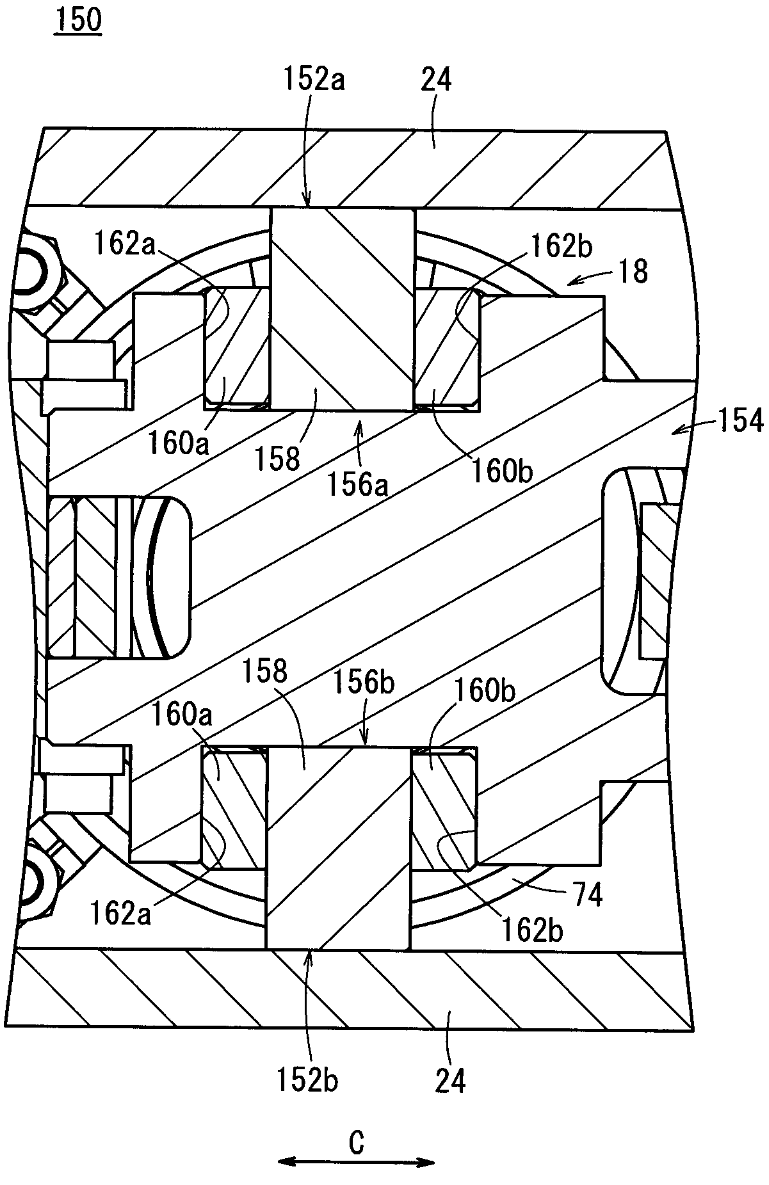
FIG. 14 is a cross sectional view taken along line XIV-XIV of FIG. 11.

On the plate bodies 24 that make up the clamp apparatus 150, the guide bodies 152*a*, 152*b* are disposed respectively on mutually confronting wall surfaces (see FIGS. 12 and 13). The guide bodies 152*a*, 152*b*, for example, have predetermined lengths in the vertical direction (the direction of arrows A and B), and are disposed at the central portions of the plate bodies 24 in the width direction. As shown in FIG. 14, each of the guide bodies 152*a*, 152*b* includes main body portion 158, which is formed with a rectangular shape in cross section, and a pair of bearings 160*a*, 160*b*, which are installed on both side surfaces of the main body portion 158.

The main body portions 158, for example, are fixed by bolts onto the plate bodies 24, and are formed in straight lines along the vertical direction (the direction of arrows A and B). The bearings 160*a*, 160*b*, for example, are formed from a metal material, and in the same manner as the main body portions 158, are formed along straight lines having a predetermined length with rectangular shapes in cross section, and are fixed by bolts to the main body portions 158. In addition, the bearings 160*a*, 160*b* include a plurality of recesses 162 on side surfaces thereof opposite to the side surfaces that abut against the main body portions 158. The recesses 162 are filled with a lubricant such as grease or the like, for example.

On the other hand, as shown in FIG. 14, the guide groove 156*a*, 156*b* through which the guide bodies 152*a*, 152*b* are inserted are formed centrally in the widthwise direction (the direction of the arrow C) of the block 154, are formed in opposite side surfaces of the block 154 that face toward the plate bodies 24, and are recessed toward the center of the block 154 with rectangular shapes in cross section. The guide grooves 156*a*, 156*b* extend perpendicularly to the widthwise direction of the block 154, and a pair of guide surfaces 162*a*, 162*b*, which are separated mutually by a predetermined distance, are arranged in sliding contact with the bearings 160*a*, 160*b* of the guide bodies 152*a*, 152*b*.

In addition, when the block 154 is raised and lowered under a driving action of the drive unit 18, since the block 154 is guided highly precisely by the guide bodies 152*a*, 152*b* that are inserted through the guide grooves 156*a*, 156*b*, together with the lubricant being provided on the bearings 160*a*, 160*b* of the guide bodies 152*a*, 152*b* via the recesses 162, the block 154 can be guided smoothly due to application of the lubricant onto the guide surfaces 162*a*, 162*b* of the guide grooves 156*a*, 156*b*.

The specific operations of the clamp apparatus 150 are basically the same as those of the clamp apparatus 10 according to the above-described first embodiment, and therefore, detailed descriptions of such operations are omitted.

The clamp apparatus according to the present invention is not limited to the above embodiments. Various changes and modifications may be made to the embodiments without departing from the scope of the invention as set forth in the appended claims.

The invention claimed is:

1. A clamp apparatus for clamping a workpiece with a pair of clamp arms by rotation of the clamp arms, comprising:

a body;

a drive unit disposed on the body and having a displaceable body which is displaced in axial directions;

first and second clamp arms, which are supported rotatably with respect to the body and are arranged in a mutually confronting manner;

a driving force transmission mechanism connected to the drive unit, and which converts linear displacement along an axial direction of the drive unit into rotary displacement and transmits a driving force of the drive unit to the first and second clamp arms; and a positioner connected to the driving force transmission mechanism for positioning and retaining the workpiece in a predetermined position at a stage prior to clamping the workpiece, wherein the positioner comprises:

a cam groove formed in the second clamp arm; and a roller supported rotatably on a block that is connected to the displaceable body, the roller being movable along the cam groove; and the cam groove comprising:

a rotation groove part, which is inclined with respect to a displacement direction of the displaceable body, and is engaged with the roller when the second clamp arm is rotated: and a restriction move part that is connected to the rotation nroove part and extends along the displacement direction of the displaceable body, the restriction groove part engages the roller to restrict further rotation of the second clamp arm, wherein rotation of the second clamp arm is restricted in advance of the first clamp arm when the driving force of the drive unit is transmitted to the first and second clamp arms when clamping of the workpiece is carried out.

2. The clamp apparatus according to claim 1, wherein the body includes a guide body against which the roller abuts and which guides the roller along the displacement direction of the displaceable body.

3. The clamp apparatus according to claim 1, wherein the body includes a guide mechanism for guiding the block along the displacement direction of the displaceable body.

4. The clamp apparatus according to claim 3, the guide mechanism comprising:

guide bodies disposed to extend in a vertical direction with respect to the body; and guide grooves formed in the block and in which the guide bodies are inserted.

5. The clamp apparatus according to claim 1, wherein the drive unit comprises a fluid pressure cylinder that displaces the displaceable body along the axial directions by supply of a pressure fluid to the fluid pressure cylinder.

6. The clamp apparatus according to claim 1, wherein the positioner further includes a positioning member and the body includes a catch groove, wherein the positioning member projects perpendicularly with respect to the longitudinal direction of the second clamp arm and is configured to contact the catch groove in a clamped state of the clamp apparatus.

7. The clamp apparatus according to claim 1, wherein after the driving force of the drive unit is transmitted to the first and second clamp arms, the positioner positions the second clamp arm to contact the workpiece prior to the first clamp arm contacting the workpiece.

* * * * *